(12) United States Patent
Calmon et al.

(10) Patent No.: US 11,157,833 B2
(45) Date of Patent: Oct. 26, 2021

(54) LEARNING SERVICE BLOCKCHAIN

(71) Applicant: International Business Machines Corporation, Armonk, NY (US)

(72) Inventors: Flavio du Pin Calmon, Cambridge, MA (US); Michele M. Franceschini, White Plains, NY (US); Ashish Jagmohan, Irvington, NY (US); Sambit Sahu, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 746 days.

(21) Appl. No.: 15/921,084

(22) Filed: Mar. 14, 2018

(65) Prior Publication Data

US 2019/0287026 A1    Sep. 19, 2019

(51) Int. Cl.
*G06N 20/00* (2019.01)
*H04L 9/08* (2006.01)
*G06F 21/60* (2013.01)
*H04L 9/06* (2006.01)

(52) U.S. Cl.
CPC ........... *G06N 20/00* (2019.01); *G06F 21/602* (2013.01); *H04L 9/0637* (2013.01); *H04L 9/0819* (2013.01)

(58) Field of Classification Search
CPC ........ G06N 20/00; G06N 5/04; G06F 21/602; G06F 16/2379; G06F 16/2365; G06F 16/2228; H04L 9/0637; H04L 9/0819
See application file for complete search history.

(56) References Cited

U.S. PATENT DOCUMENTS

| 8,719,173 | B2 | 5/2014 | Beisty et al. |
| 8,918,520 | B2 | 12/2014 | Peterson et al. |
| 9,762,553 | B2 | 9/2017 | Ford et al. |
| 10,733,515 | B1 * | 8/2020 | Mishra ................... G06N 20/00 |
| 2015/0269617 | A1 | 9/2015 | Mikurak |
| 2016/0300223 | A1 | 10/2016 | Grey et al. |

(Continued)

OTHER PUBLICATIONS

Hull, R., Batra, V. S., Chen, Y., Deutsch, A., Heath,Fenno F.Terry, I.,II, & Vianu, V., (2016). Towards a shared ledger business collaboration language based on data-aware processes. Springer Verlag. doi:http://dx.doi.org/10.1007/978-3-319-46295-0_2.

(Continued)

*Primary Examiner* — Peter D Nolan
*Assistant Examiner* — Roy Rhee

(57) ABSTRACT

An example operation may include one or more of partitioning a data set from a data provider into a training data set and a test data set, exposing the training data set to a learning service provider while preventing the learning service provider from being able to access the test data set, wherein the preventing comprises encrypting the test data set and storing the encrypted test data set in an immutable ledger, receiving a learning model that is generated by the learning service provider based on the exposed training data set, executing the received learning model using the test data set as input to verify whether the learning model satisfies a predefined performance threshold, and in response to verifying the learning model satisfies the predefined performance threshold, outputting information about the verification to a computing node.

16 Claims, 11 Drawing Sheets

(56) References Cited

U.S. PATENT DOCUMENTS

| | | | |
|---|---|---|---|
| 2017/0243193 A1 | 8/2017 | Manian et al. | |
| 2018/0035142 A1* | 2/2018 | Rao | H04N 21/252 |
| 2018/0115538 A1* | 4/2018 | Blake | H04L 9/14 |
| 2019/0228006 A1* | 7/2019 | Tormasov | H04L 9/3239 |
| 2020/0279156 A1* | 9/2020 | Cai | G06N 3/04 |

OTHER PUBLICATIONS

Nakasumi, M., (2017). Information sharing for supply chain management based on block chain technology. doi:http://dx.doi.org/10.1109/CBI.2017.56.

* cited by examiner

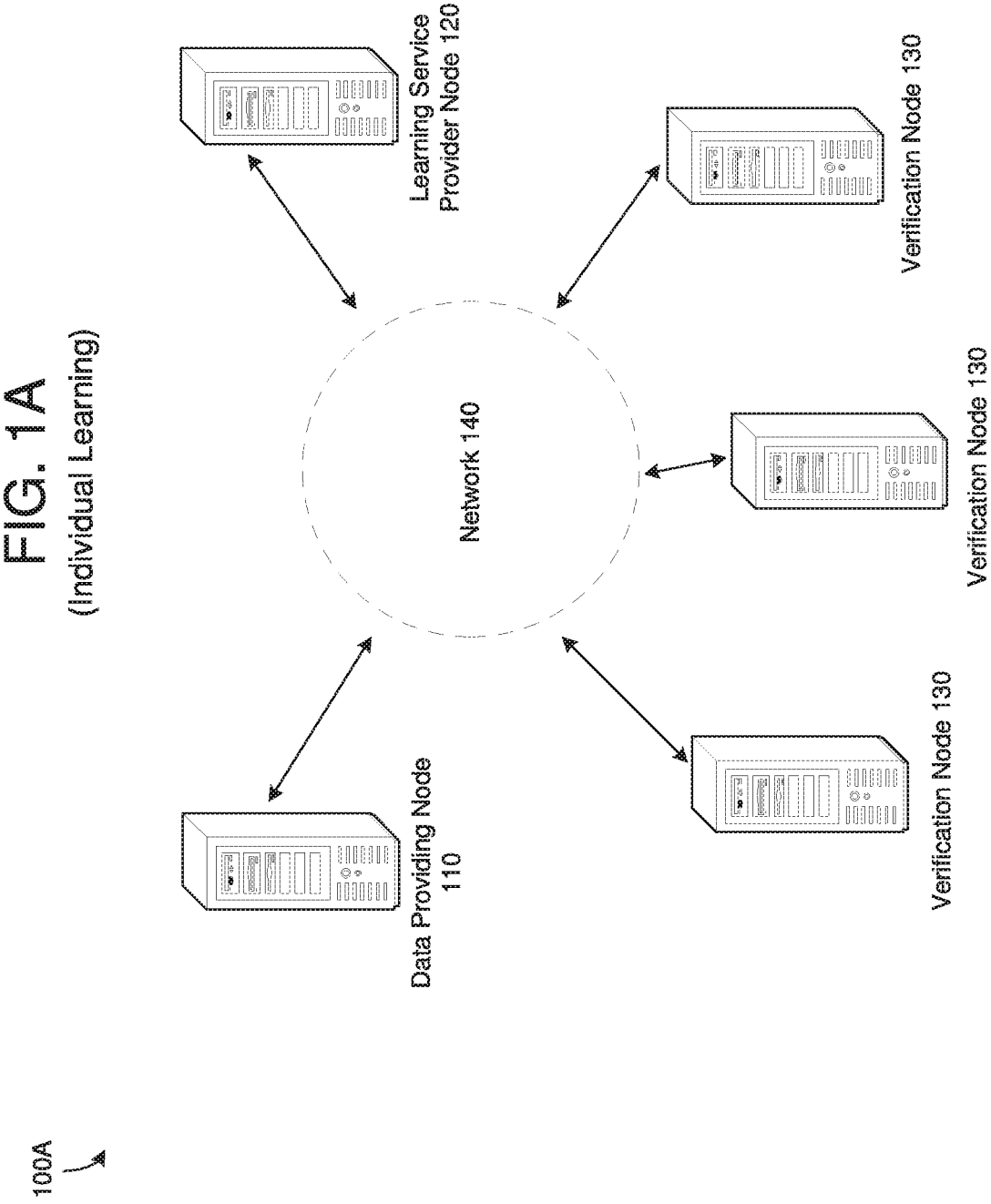

(Collaborative Learning)

400A (Incremental Data Buckets)

400B (Distillation)

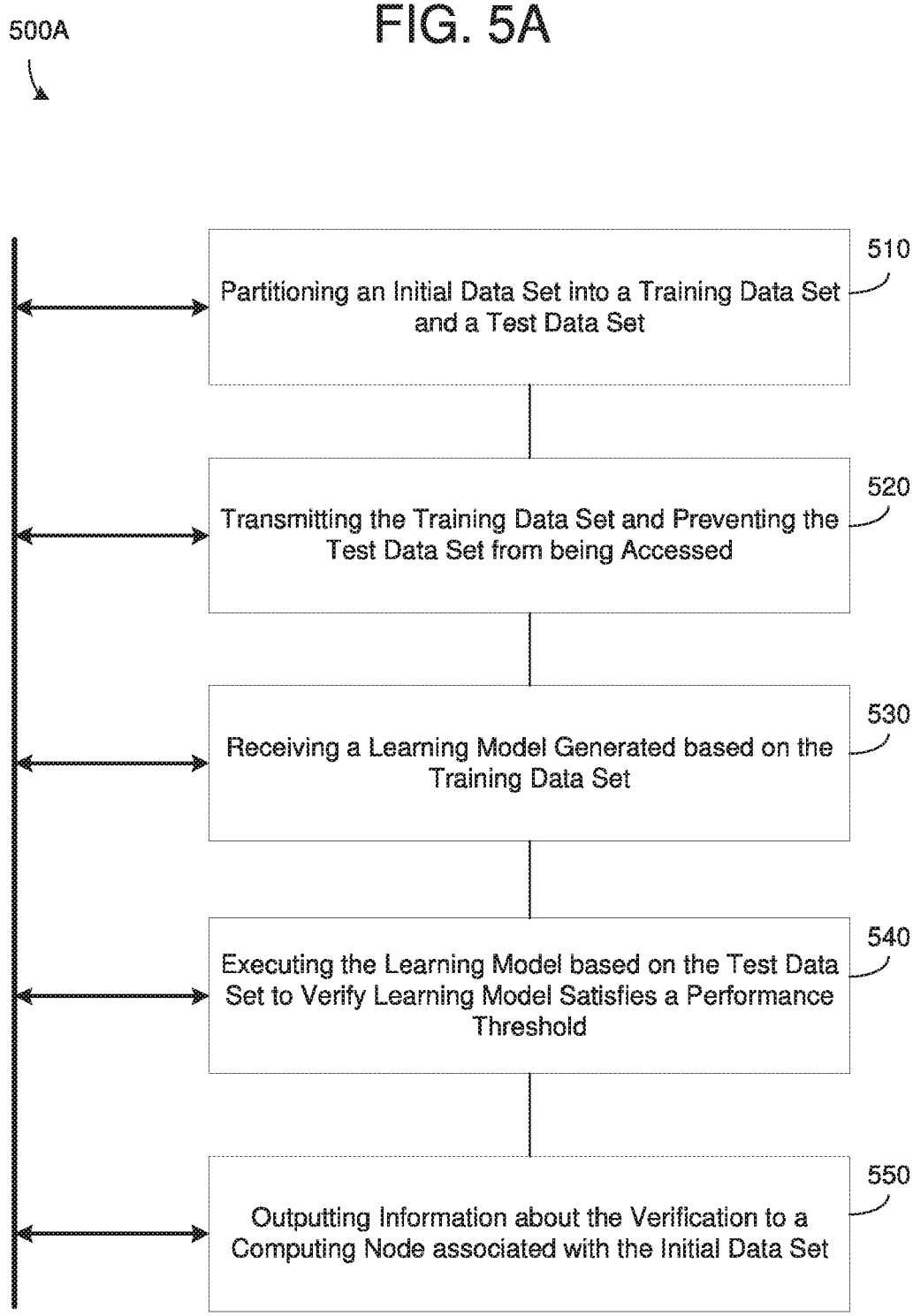

LEARNING SERVICE BLOCKCHAIN

TECHNICAL FIELD

This application generally relates to a learning environment for distinct entities, and more particularly, to a mutual learning environment which ensures fairness and accountability during a mutually exchanged learning process through interaction with an immutable ledger (such as a blockchain).

BACKGROUND

A ledger is commonly defined as an account book of entry, in which transactions are recorded. A distributed ledger is ledger that is replicated in whole or in part to multiple computers. A cryptographic distributed ledger (CDL) can have at least some of these properties: irreversibility and immutability (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), and verifiability (all transactions can be cryptographically verified). A blockchain is an example of a CDL. While the description and figures herein are described in terms of a blockchain or an immutable ledger, the instant application applies equally to any CDL.

Although, primarily used for financial transactions, a blockchain could also be used to store various information related to goods and services (i.e., products, packages, status, etc.). A decentralized scheme provides authority and trust to a decentralized network and enables its nodes to record their transactions on a "block", creating a unique "chain" referred to as a blockchain. Hash codes may be used to secure an authentication of a transaction source and remove a central intermediary. The immutable ledger of the blockchain may include a database or other data storage means that maintains a continuously-growing list of records in the blockchain blocks, which are secured from tampering and revision due to their immutable properties. In some cases, the blocks may be linked to one another or they may be separate. Blockchain can be used to hold, track, transfer and verify information.

Conventionally, entities with proprietary data are not able to share that data among each other due to various privacy and security restrictions of their customer data. Furthermore, these entities typically do not want to share their proprietary data because it has significant intrinsic value that is due to the entity's unique business dealings. As an example, a first shipping entity may primarily performing shipping in a first jurisdiction while a second shipping entity may primarily perform shipping in a second jurisdiction. Here, the first shipping entity may have valuable data for the first jurisdiction while the second shipping entity may have valuable data for the second jurisdiction. Both of these entities could help the other create a bigger picture of shipping data and logistics. However, these entities do not have a secure way of sharing their information without risking theft, loss, or non-performance from the other party. Accordingly, what is needed is a new system for sharing of information that promotes growth and learning.

SUMMARY

One example embodiment may provide a method that includes one or more of partitioning a data set from a data provider into an initial training data set and an initial test data set based on one or more data partition attributes, transmitting the initial training data set to a learning service provider while preventing the learning service provider from being able to access the initial test data set, wherein the preventing comprises encrypting the initial test data set and storing the encrypted test data set in a data block of an immutable ledger where it can be subsequently audited, receiving a learning model that is generated by the learning service provider based on the initial training data set, executing the received learning model using the initial test data set as input to verify whether the learning model satisfies a predefined performance threshold, and in response to verifying the learning model satisfies the predefined performance threshold, outputting information about the verification to computing node that is associated with the data provider of the data set.

Another example embodiment may provide a system that includes one or more of a processor configured to perform one or more of partition a data set from a data provider into an initial training data set and an initial test data set based on one or more data partition attributes, transmit the initial training data set to a learning service provider and prevent the learning service provider from being able to access the initial test data set, wherein the processor encrypts the initial test data set and stores the encrypted test data set in a data block of an immutable ledger where it can be subsequently audited, and a network interface configured to receive a learning model that is generated by the learning service provider based on the provided initial training data set, wherein the processor is further configured to execute the received learning model based on the initial test data set as input to verify whether the learning model satisfies a predefined performance threshold, and in response to the learning model being verified, control the network interface to output information about the verification to a computing node that is associated with the data provider of the data set.

A further example embodiment may provide a non-transitory computer readable medium comprising instructions, that when read by a processor, cause the processor to perform one or more of partitioning a data set from a data provider into an initial training data set and an initial test data set based on one or more data partition attributes, transmitting the initial training data set to a learning service provider while preventing the learning service provider from being able to access the initial test data set, wherein the preventing comprises encrypting the initial test data set and storing the encrypted test data set in a data block of an immutable ledger where it can be subsequently audited, receiving a learning model that is generated by the learning service provider based on the initial training data set, executing the received learning model using the initial test data set as input to verify whether the learning model satisfies a predefined performance threshold, and in response to verifying the learning model satisfies the predefined performance threshold, outputting information about the verification to computing node that is associated with the data provider of the data set.

BRIEF DESCRIPTION OF THE DRAWINGS

FIG. 1A is a diagram illustrating a learning environment with a participant, according to example embodiments.

FIGS. 5A-5B are diagrams illustrating methods for shared and mutual learning, according to example embodiments.

DETAILED DESCRIPTION

Figure 1B:
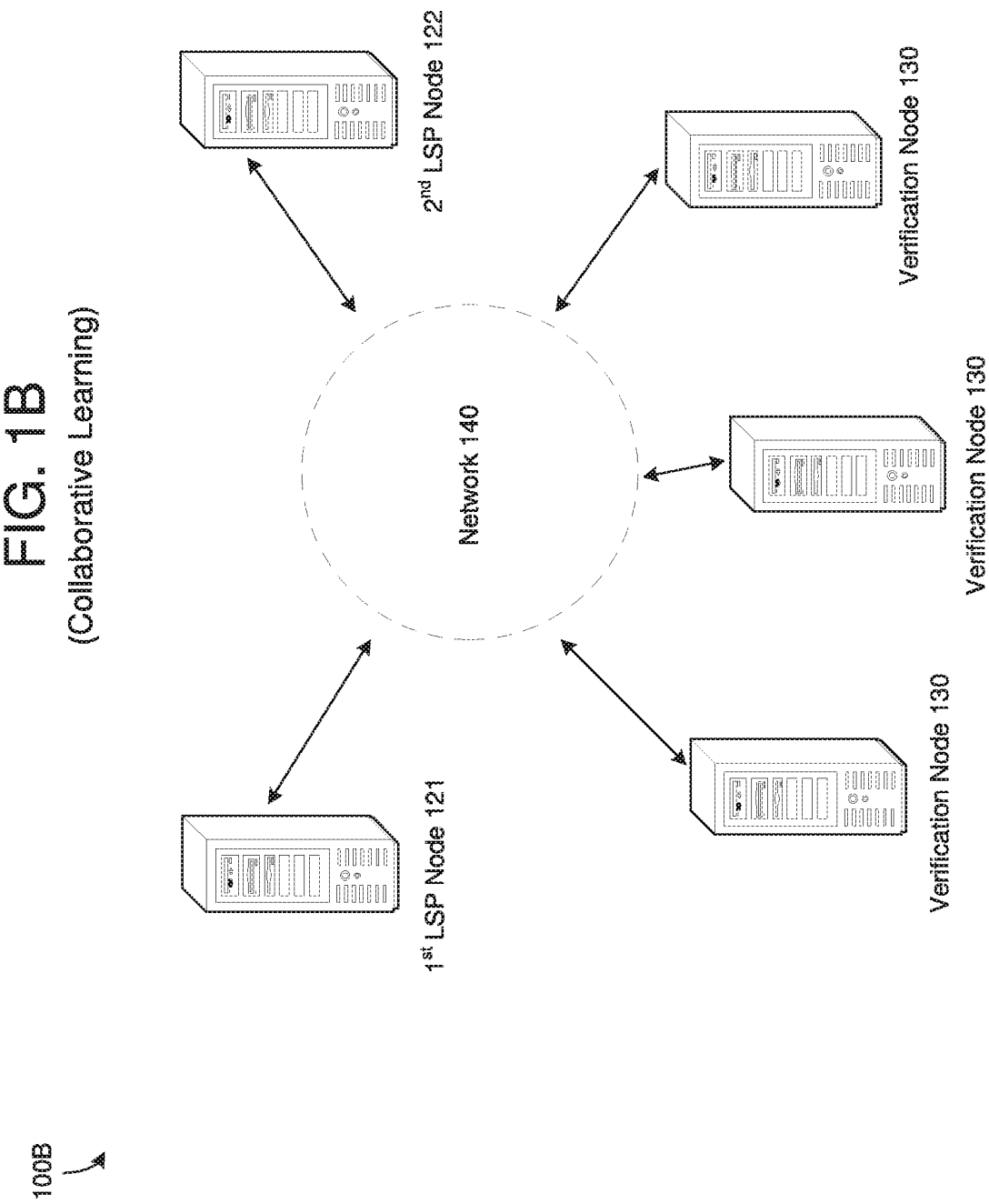
FIG. 1B is a diagram illustrating a mutual learning environment with multiple participants, according to example embodiments.

It will be readily understood that the instant components, as generally described and illustrated in the figures herein, may be arranged and designed in a wide variety of different configurations. Thus, the following detailed description of the embodiments of one or more of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, devices, networks and/or systems, which support a blockchain network capable of implementing a mutually exchanged and trusted learning environment. In some embodiments, one entity may learn based on learning capabilities of another entity, while in other embodiments, multiple entities may learn from each other through a mutual exchange of learning models and data. Proprietary data is usually sensitive and valuable data that has been accumulated by a business or another organization over time and through unique dealings. Proprietary data is also sensitive in that it often contains confidential information about a person, a business, a trade secret, and the like. Proprietary data can also exhibit attributes which can be learned from to predict or otherwise improve future activities, and the like. As one non-limiting example, historical delivery data may help a shipping carrier predict logistics for an upcoming delivery to ensure timeliness of the delivery. As another non-limiting example, machine performance history may be used by a technician service to predict when a machine might break-down enabling the manufacturer to properly make repairs and maintenance ahead of time.

Some of the benefits of such a system include the ability of a data owner to receive benefit to their proprietary data through mutual exchange of data and learning models with another similar data owner. In this way, each learning service provider can use their own proprietary data to improve the learning of another party without having to divulge their proprietary data. Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the mutual learning is implemented in a trusted and fair manner because of the immutable ledger and the distributed network which are inherent and unique to blockchain. In particular, verification nodes and the blockchain can provide a layer of verification between a data provider and a learning service provider to ensure that the learning service provider trains a generalizable learning model (i.e., a model that will perform well on new, previously unseen data) and does not just create a seemingly high-performing (but actually non-generalizing) model based on knowing the data that the model's performance is going to be tested and measured against. Furthermore, the verification nodes may ensure that the data provider satisfies their obligations such as payment or even another learning model enhancing the learning service provider's data before receiving access to the learning model created by the learning service provider.

A blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a consumer or submitting node which submits a request to build an AI asset to an aggregator. The aggregator may broadcast requests for building the AI asset to a producer nodes. Each node can be provided different rights and privileges within the blockchain network based on their assigned role.

A ledger is a sequenced, tamper-resistant record of all state transitions of a blockchain. State transitions may result from chaincode invocations (i.e., transactions) submitted by participating parties (e.g., consumer nodes, aggregator nodes, producer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which may be structured as hash-linked blocks, and each block contains a sequence of N transactions where N is equal to or greater than one. The block header includes a hash of the block's transactions, as well as a hash of the prior block's header. In this way, all transactions on the ledger may be sequenced and linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

FIG. 1A illustrates a learning environment 100A with a single data providing participant, according to example embodiments, and FIG. 1B illustrates a mutual learning environment 100B with multiple data provider participants, according to example embodiments. Referring to FIG. 1A, learning environment 100A includes a data providing node 110, a learning service providing node 120, and a plurality of verification nodes 130. Although not shown in this example, the learning environment 100A also includes an immutable ledger such as a blockchain which can be accessed by any of the data providing node 110, the learning service providing node 120, and the verification nodes 130. In some embodiments, the learning environment 100A may not include verification nodes. Rather, the verification may be performed by the data providing node 110 and the learning service providing node 120 via the blockchain.

In this example, the data providing node 110 has data that may be used to generate a learning model such as a machine learning model. Machine learning models typically require data (such as historical data) for training the machine learning model. The more data available for training the more accurate the machine learning model may become. However, data providing node 110 may not know or may not have the capabilities to generate a machine learning model. In this example, the learning service providing node 120 does have the ability to generate a machine learning model based on the data providing node 110 data. But the data providers data may be sensitive or secure data. In other words, the data providing node 110 may not want to divulge their data unless it is safe and secure, and unless the data providing node 110 can guarantee they are receiving something of value in return (i.e., shared value). On the other hand, the learning service providing node 120 may not want to provide valuable learning services unless they are guaranteed they are receiving something of value in return. The learning environment 100A makes this possible, and also allows for parties like the data providing node 110 and the learning service providing node 120 to access each other's data and services where it would not normally have been accessible.

As described herein, a learning model is a parameterized piece of code or mathematical function. A trained learning model is the learning model plus a set of parameter values. For example, a specific neural net architecture implementation plus values of the neural net weights. In these examples, a trained learning model takes data as an input, and produces an output such as a cluster-set, a prediction, a class-label, a regression value, a recommended action, or the like, as output (other types of responses/outcomes are possible as well). A learning service provider may provide model training as a software service, where the output of the service is a trained model. One of the concerns addressed by the examples herein is how to ensure that the consumer (data providing node) and the learning service provider can validate the value of the learning model to the consumer, in a trustworthy and fair manner.

In some embodiments, the data providing node 110 and the learning service providing node 120 may agree on the terms or other characteristics of value to be provided from each party. For example, the data providing node 110 may require that the learning model be at least 75% accurate, while the learning service providing node 120 may require a payment or some other value. As another example, the payment or other value required by the learning service providing node 120 might increase with increasing accuracy of the model. The agreement details may be implemented via a smart contract which is installed on any of the data providing node 110, the learning service providing node 120, and the verification nodes 130. In one example, the data providing node 110 may provide their data to the verification nodes 130. One of the verification nodes (or all) may partition the data from the data providing node 110 into a learning data set and a test data set and transmit the learning data set only to the learning service providing node 120. Meanwhile, the verification node 130 may hash the test data (and the training data) and store the hashed data on one or more linked blocks of the blockchain where it can be audited/verified at a later time. The verification node 130 may partition the data based on one or more attributes such as a date, a type, a content, randomly, or the like. The purpose of partitioning the data by the verification node 130 ensures that data providing node 110 cannot manipulate the data after model-training is complete (to, for example, manipulate model performance), and also ensures that some of the data is kept or is otherwise secure for testing purposes preventing the learning service providing node 120 from manipulating the learning model based on the test data rather than actually training a generalizable learning model based on the training data.

The learning service providing node 120 generates a learning model based on the training data and provides the learning model to the verification nodes 130. In response, the verification nodes 130 may hash the learning model and store the hashed learning model via one or more blocks in the blockchain. The block or blocks including the hashed learning model may be linked to the block or blocks of the hashed test/train data through a successively linked chain of blocks where each block includes a hash of the previous block. The verification nodes 130 may further execute the learning model and input the test data which was hidden from the learning service providing node 120 to the executing learning model. Accordingly, the verification nodes 130 can measure the generalization performance of the model while ensuring that the model was not just manipulated based on test data. The verification process may be performed based on a smart contract executed by the verification nodes which may provide a level or levels of performance that must be achieved by the learning model in order for payment or different levels of payment to be provided to the learning service providing node 120 from the data providing node 110. After the testing is performed, the verification nodes 130 may vote on the performance creating an aggregate performance which may be provided to either or both of the data providing node 110 and the learning service providing node 120 for final payment/transmission of the learning model.

FIG. 1B illustrates a mutual learning environment 100B where multiple nodes provide both data and learning models in a mutual exchange of value to the other. In this example, the same process is performed as described in FIG. 1A except that there are two learning service providing nodes 121 and 122 with their own data. In this example, both learning service providing nodes 121 and 122 provide data to the verification nodes 130 which partition the data, hash the partition data (test/train) from each, and store the hashed data via the blockchain. In addition, the verification nodes 130 provide the training data from the learning service providing node 121 to the learning service providing node 122, and provide the training data from the learning service providing node 122 to the learning service providing node 121. In this example, each learning service providing node 121 and 122 attempts to create a learning model for the other node using a combination of its own data and the training data received from the other learning service providing node. It will be appreciated that this combining might involve using only the learning service providing node's own data or using only the training data received from the other learning service providing node, or both. When both nodes can provide a learning model that satisfies a performance threshold previously agreed upon, the learning models are mutually exchanged.

The learning process performed within the mutual learning environment may be iteratively performed. For example, each learning service providing node 121 and 122 may not provide all of their data at once, but may instead provide the data in buckets. Also, each learning service providing node 121 and 122 may not use all of its own data at once during model training, but may instead use that data for training in buckets. In this example, each iteration of the process is performed to determine whether each learning service providing node 121 and 122 can improve/update the learning model from the previous performance based on new data. In each iteration, each learning service providing node 121 and 122 provides an updated learning model to the verification nodes 130, and the verification nodes verify if the performance of the updated models satisfy performance thresholds previously agreed upon; in some embodiments, this may include differential performance thresholds where the difference of the performance of the two updated models should not exceed a certain threshold. If the verification nodes 130 determine that the performance thresholds are satisfied, the next iteration starts where both nodes will attempt to further improve the updated models.

If, instead, the verification nodes 130 determine that the performance thresholds of one of the learning service nodes 121 and 122 are not satisfied, the iterative process terminates. Upon termination, the verification nodes 130 might determine residual payments and/or models to be exchanged between the learning service providing nodes 121 and 122. This may be done per a pre-specified smart contract running on the blockchain. This embodiment protects one of the learning service providing nodes from giving more value than the other learning service providing node by performing incremental improvements to the learning model until one of the learning service providing nodes is unable to improve the learning model of the other. In this example, mutual value-driven mutual learning may be performed between two or more learning service providers where data and learning models flow back and forth between participants.

In some embodiments, each iteration may involve an exchange of a larger amount of data than the last iteration. In some embodiments, each iteration may involve the use of a larger amount of data by each learning service providing node 121 and 122 for training its model, where the larger amount of data may include a larger amount of its own data and/or a larger amount of data received from the other learning service providing node. In some embodiments, the verification nodes 130 might provide both updated models to each node at the end of each iteration. In some embodiments, there might be only one learning model, and in each iteration one of the two learning service providers 121 and 122 attempts to update the learning model. In these embodiments, the updated model is then provided to the verification nodes 130, and if the performance of the model exceeds a pre-specified threshold, the verification nodes 130 communicate the model to the other learning service provider node for the next iteration; if the performance does not exceed the pre-specified threshold, the process terminates.

As described with respect to the examples of FIGS. 1A and 1B, there are several possible embodiments. In one embodiment, the data owner might already know the model provider, and the two parties may just want to ensure trusted exchange of model and compensation. In this case the data owner can inform the verification nodes of the model provider (learning service provider) it wishes to use. The verification nodes take the owner data and partition it into test and train per the smart contract. The train data is then sent by the verification nodes to the learning service provider. The learning service provider then builds a model based on the training data. This model is sent back to the verification nodes. The verification nodes validate (via vote in one embodiment) that the performance achieved with the model on the test data (which was not sent to the learning service provider) satisfies the smart contract; or alternatively, the verification nodes determine the compensation due to the learning service provider per the smart contract, and the performance achieved by the model on the test data. Finally, the data provider pays the model provider per the compensation decided by the verification nodes and receives the learning model in full.

In a second embodiment, there are multiple participants each of which is a data owner and model builder, and some additional verification nodes, and there is a single learning model that the data owners/model builders progressively update over multiple iterations. In this case, after the verification nodes have generated the test/train sets, an iterative process of model sharing may occur where each data-owner/ model-builder participant takes turns to improve the model and send it to the verification nodes. The verification nodes verify if the improvement of the model in this turn satisfies the smart contract, and if so, the next participant gets a turn to improve the model. This process ends (in one embodiment) once the model cannot be improved by one or more participants; in an alternative embodiment once a model cannot be improved by a participant, that participant no longer participates in the iterative process and no longer receives updated learning models. Residual payments may also be made per smart contract when one participant provides less improvement to the other participant's data.

In a third embodiment, there are multiple participants each of which is a data owner and model builder which iteratively build a learning model, and no additional verification nodes are required. Instead, each participant generates a test set, and then hashes the test set on to the blockchain. The verification of the performance of the learning model in each iteration is performed by each participant, and the decision on whether the updated model satisfies predetermined performance thresholds may be performed by a vote among the participants. The performance measurements reported by each participant may be additionally stored (possibly after hashing or other pre-processing) on the blockchain for later auditability.

Figure 2A:
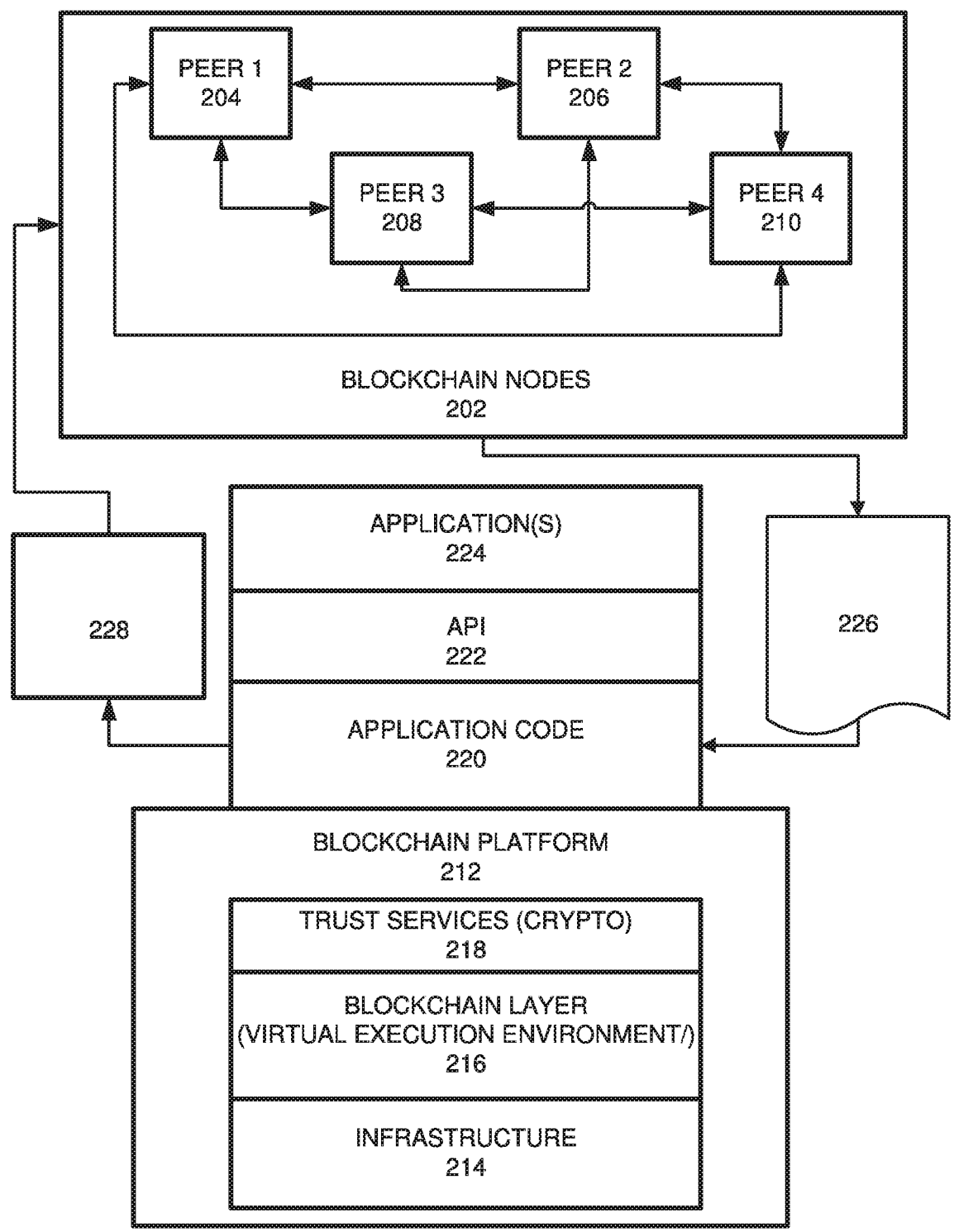
FIG. 2A is a diagram illustrating a peer node blockchain architecture configuration for an asset sharing scenario, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210. (4 nodes are depicted by example only). These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, performance threshold information 226 which is agreed upon by two or more parties to a mutually exchanged learning process may be processed by one or more processing entities (e.g., virtual machines) included in the blockchain layer 216. The mutual learning result 228 may include an indication of whether the learning service provider satisfied a performance threshold or an amount of satisfaction (e.g., 75%, etc.) The physical infrastructure 214 may be utilized to retrieve any data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, the chain code could write a hashed training data set and a hashed test data set to one or more blocks of the blockchain, which may be provided to one or more of the nodes 204-210.

Figure 2B:
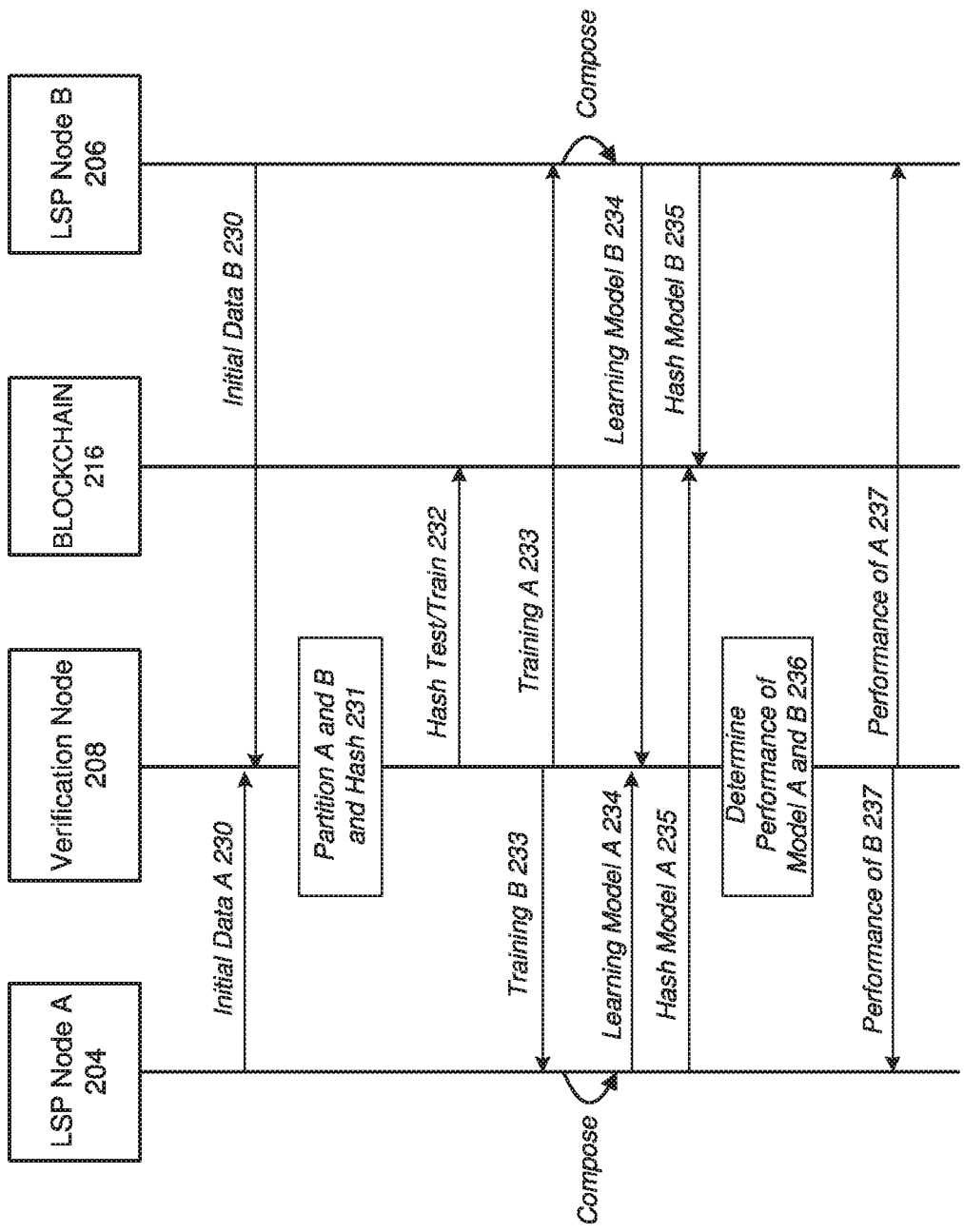
FIG. 2B is a diagram illustrating a transactional flow between blockchain nodes, according to example embodiments.

FIG. 2B illustrates a transactional flow 250 between blockchain nodes, according to example embodiments. In this example, the nodes from FIG. 2A are used as examples and include a learning service providing node A (LSP node A) 204, a LSP node B 206, a verification node 208, and a blockchain 216 which may be stored and replicated across nodes in the network such as verification nodes. The example of FIG. 2B illustrates a transaction flow 250 of a collaborative learning (mutually exchanged learning) performed between two LSP nodes A and B. In this example, the LSP node A 204 and the LSP node B 206 may agree on required performance by the other prior to beginning the transaction and may store the particulars via a smart contract. For example, each LSP node may be required to generate at least 50% improvement during each iteration or the learning session ends.

Referring to FIG. 2B, in 230, the LSP node A 204 and the LSP node B 206 may each provide their data to the verification node 208. In 231, the verification node 208 may partition both of the data sets into respective test/train data sets and hash the respective test/train data sets using a cryptographic hash or some other hash. In 232, the verification node 208 may store the hashed partitioned data sets on one or more linked blocks of the blockchain 216 where it can be audited/verified at a later time. For example, the verification node 208 may partition each data set based on one or more attributes such as a date, a type, a content, randomly, or the like. Further, in 233, the verification node 208 may transmit the training data set B from LSP node B 206 to the LSP node A 204 for purposes of generating a learning model. Also, the verification node 208 may transmit the training data set A from LSP node A 204 to the LSP node B 206 for the purposes of generating another learning model. Each learning model being generated may be different or the same depending on the agreement between the parties. For example, both parties may be shipping carriers and one may have more data in a first jurisdiction (such as state A) while the other may have more data in a second jurisdiction (such as state B). In this case, both LSPs may use each other's data as a way to improve their own data models and create a bigger picture of the shipping logistics.

In response to receiving respective training data, both the LSP node A 204 and the LSP node B 206 may build or otherwise compose learning models based on the training data. Each of the LSP node may generate the learning model based on their own proprietary data without having to divulge the proprietary data thereby making use of their proprietary data without actually having to divulge or expose it. In 234, each of the LSP node A 204 and the LSP node B 206 provider their respectively generated learning models to the verification node 208. In addition, each of the LSP nodes A and B may hash their respective learning models and store them via the blockchain 216 where they can be audited/verified at a later time. In 236, the verification node 208 determines whether each learning model satisfies performance requirements as implemented via a smart contract. In 237, the verification node 208 may provide notification of the performance of the other party to each of the LSP node A 204 and the LSP node B 206. Here, the entire process from 230-237 may be iteratively repeated to continuously perform learning between the LSP nodes until one of the nodes is no longer able to improve their model/data.

Figure 3:
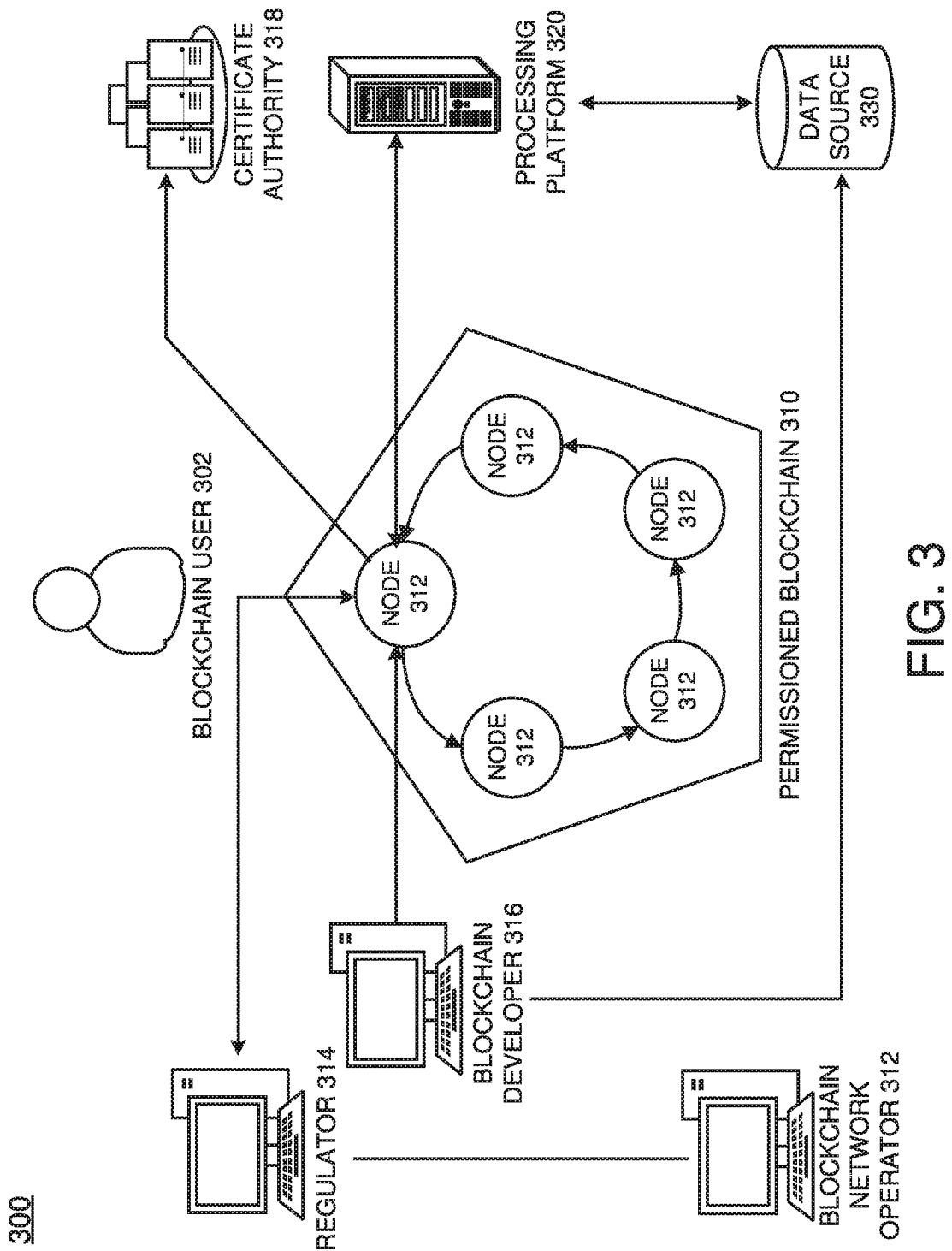
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 312 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4A:
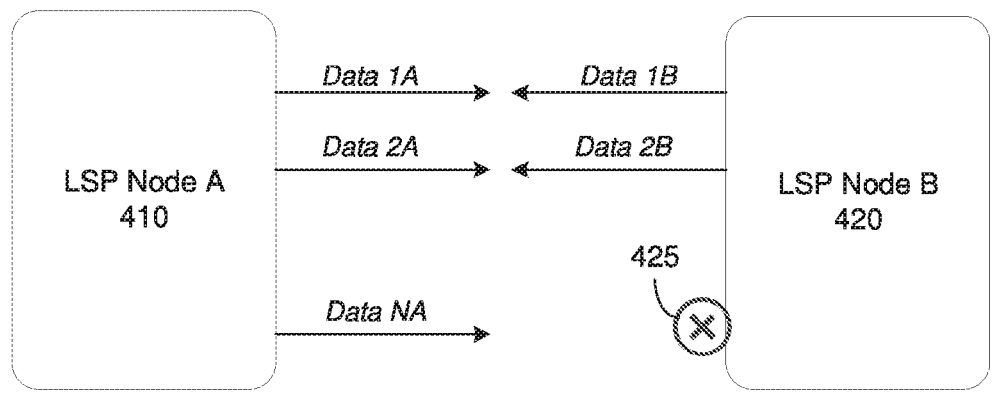
FIGS. 4A-4B are diagrams illustrating processes for incremental collaboration, according to example embodiments.
Figure 4B:
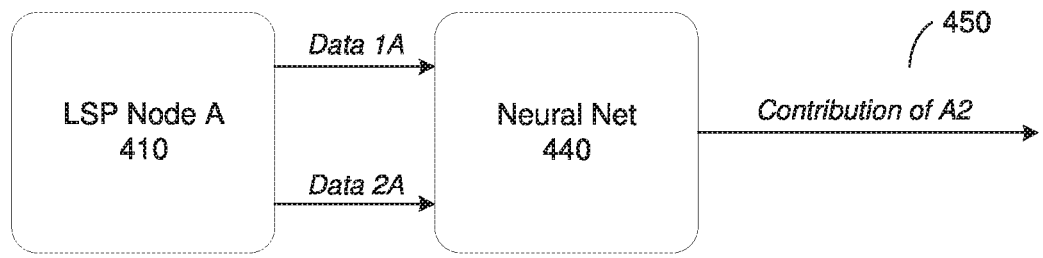

FIGS. 4A-4B are diagrams illustrating processes 400A and 400B for incremental collaboration, according to example embodiments. In the examples of FIGS. 4A and 4B an amount of collaboration between two learning service providers 410 and 420 is determined differently. In particular, in FIG. 4A an incremental data exchange process 400A is performed while in FIG. 4B, a distillation process 400B for determining value provided is performed via a neural network 440.

Referring to FIG. 4A, each LSP node 410 and 420 is also a data provider. Rather than exchange all of their data at once, the data is separated into buckets (layers). Each data bucket may go through the process outlined in FIG. 2B and partitioned by a verification node (not shown). Each time a previous data bucket has improved the model as defined by a smart contract, the process repeats. In this example, each LSP node 410 and 420 uses a first layer of data and trains the model based on the other's first layer of data and sends it to the verification node for performance evaluation. In the next step, each LSP node 410 and 420 uses a second layer of data provided from the other and trains the model based on the second layer of data and sends it to the verification node for performance evaluation. In some embodiments, each iteration may gradually or significantly increase the amount of data being provided by each party. By incrementally working through the data/model generation process, the larger data holder between the two LSP nodes 410 and 420 does not provide more value while the smaller data holder does not get extra value when they can no longer provide new value. In the example of FIG. 4A, in iteration N the LSP node B 420 cannot improve the model, in step 425, and the process ends. In an alternative embodiment, data exchange only happens once, before the first iteration. In the first iteration, each LSP node 410 and 420 uses a first layer of its own data to train a learning model, a data and sends it to the verification node for performance evaluation. In the next step, each LSP node 410 and 420 uses a second layer of its own data and trains the model based on the second layer of data and sends it to the verification node for performance evaluation. This iterative process continues until one or both of the LSP nodes 410 and 420 can no longer improve the model.

Meanwhile, FIG. 4B provides an example of a process 400B in which both LSP nodes 410 and 420 are improving a common learning model incrementally over time. In one embodiment this is done by using a neural network 440 at an LSP (which in the example of FIG. 4B is the LSP node 410). The neural network 440 may use outputs generated by the existing model and an incremental model (trained for example on a new bucket of data) during training. In some embodiments, for a given input feature vector it may compute a mathematical combination of its output, the output from the existing model and the output from the incremental model to compute an error value used to train its weights. Once training is complete, the neural network 440 becomes the updated model that will be communicated by the LSP to the verification node and/or other LSP. The LSP can estimate how much incremental value/contribution 450 is being created by this updated model, and may terminate training once the contribution 450 is enough to exceed the performance threshold used in verification. The LSP might also add further buckets of its own data if the contribution is not high enough.

Figure 5B:
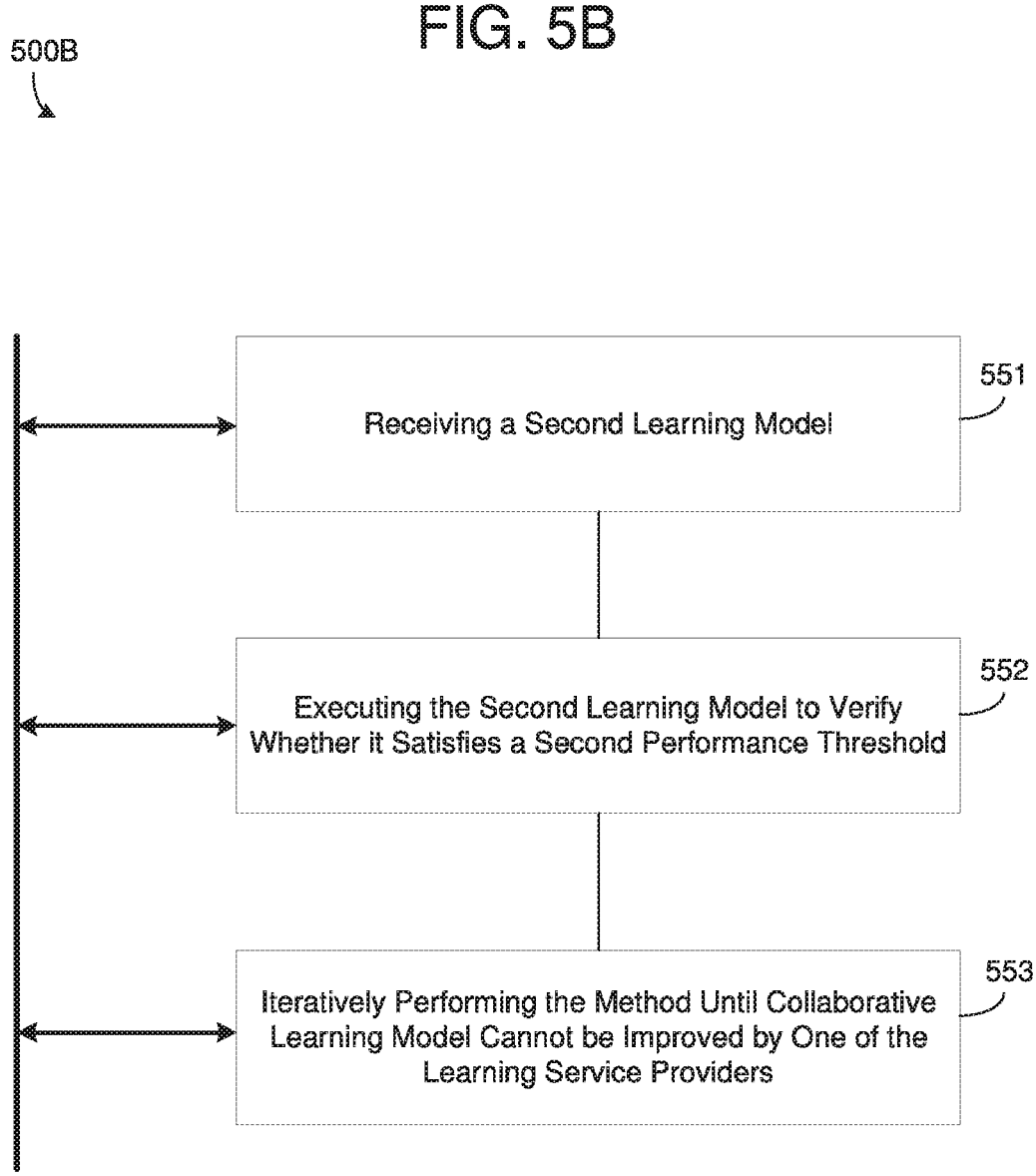

FIGS. 5A-5B illustrate methods 500A and 500B for shared and collaborative learning, according to example embodiments. As an example, the methods 500A and 500B may be performed by a blockchain node such as a data providing node, a learning service node, a verification node, and the like. In these examples, a data provider has data and a learning service provider is composing a learning model based on the data from the data provider. Referring to FIG. 5A, in 510, the method may include partitioning an initially provided data set from the data provider into a training data set and a test data set based on one or more data partition attributes. For example, the data provider may provide a block of proprietary data or other data that is non-proprietary to a verification node. In this example, the verification node may execute a smart contract which determines how much of the data should be allocated for training a learning model and how much of the data should be allocated for testing the learning model after it has been generated. In some embodiments, the smart contract may divide the initial data such that the training data is significantly larger than the test data. The data may be partitioned based on one or more attributes, for example, a type of data, a time at which the data was captured, randomly, custom rules, and the like. Also, in some embodiments, the data may be mutually exclusive such that the test data is truly hidden from the learning service provider.

In 520, the method may include providing the initial training data set to a learning service provider while preventing the learning service provider from being able to access the initial test data set. For example, the verification node may transmit the training data to the learning service provider while encrypting the initial test data set (and the test data set) and storing the encrypted data set in a data block of an immutable ledger such as a blockchain where it can be subsequently audited. By storing the test data in an encrypted format, the data can be audited after a learning model has been generated and submitted to the verification node by the learning service provider. For example, the verification node can provide the learning service provider with an encryption key for decrypting the test data after the learning service provider delivers a learning model to the verification node or stores it on the blockchain. However, until the learning service provider delivers a learning model, the test data can remain encrypted thereby preventing the learning service from cheating or otherwise deliberately modifying the learning model to accommodate the specifics of the test data without doing actual learning.

In 530, the method may include receiving a learning model that is generated by the learning service provider based on the provided initial training data set. For example, the learning model may be a software code, program, service, application, or the like, which can be used to predict or otherwise make decisions based on historical data included in the training data. In 540, the method may include executing the received learning model using the initial test data set as input to verify whether the learning model satisfies a predefined performance threshold. Here, the test data may be held by the verification node without divulging the test data to other nodes thereby ensuring that the testing performed by the verification node truly and authentically verifies the performance of the learning model. In some embodiments, the verifying of the learning model may be performed by a smart contract executed by the verification node which has incorporated therein a method for testing the learning model code based on the test data as an input, and also a predetermined threshold which the learning model must achieve in order to move to the next iteration or to receive a certain value/payment.

In response to verifying the learning model satisfies the predefined performance threshold, in 550 the method may include outputting information about the verification to computing node that is associated with the data provider of the initially provided data set. For example, the verification node may inform the data provider that the learning model has met a certain threshold value, and that the data provider must deliver payment to the learning service provider before receiving the learning model from the verification node. In some embodiments, the method may further include transmitting an encryption key for decrypting the encrypted initial test data set to a verification system (which may or may not be the learning service provider) to enable the verification system to audit the verified performance threshold.

In some embodiments, the method 500A of FIG. 5A may further include one or more of iteratively receiving a learning model from one or more of a plurality of learning service providers, executing the iteratively received learning model on one or more of a plurality of test data sets provided by one or more of a plurality of data providers to verify whether the iteratively received learning model satisfies a predetermined performance threshold, selecting one or more learning service providers to further update the learning model, based on the execution and verification from the current and previous iterations, the updated learning model to be communicated to the processor at the start of the next iteration, and terminating the process based on the execution and verification steps from the current and previous iteration.

FIG. 5B illustrates an example of a method 500B in which mutual shared learning is performed between at least two data providers which also perform the role of learning service providers. It should be appreciated that mutual shared learning may be iteratively performed until one or more of the learning service providers can no longer add value to the other entity's data. In this example, a first learning model has been generated by a first learning service based on an initially provided data set from an initial data provider. In response, a second learning service provider performs a learning service on training data provided by the first learning service provider. Here, the second learning service provider may be the same entity as the initial data provider.

Referring to FIG. 5B, in 551, the method 500B may include receiving a second learning model that is generated by the second learning service provider based on a second training data set that is provided by the first learning service provider (which may be a second data provider). In 552, the method may further include executing the second learning model using a second test data set provided by the first learning service provider to verify whether the second learning model satisfies a predetermined performance threshold. In 553, the method may further include iteratively receiving updates of the first learning model and the second learning model from the first learning service provider and the second learning service provider, respectively, until either of the first learning service provider or the second learning service provider are no longer able to improve the respective learning model with their data.

Figure 6A:
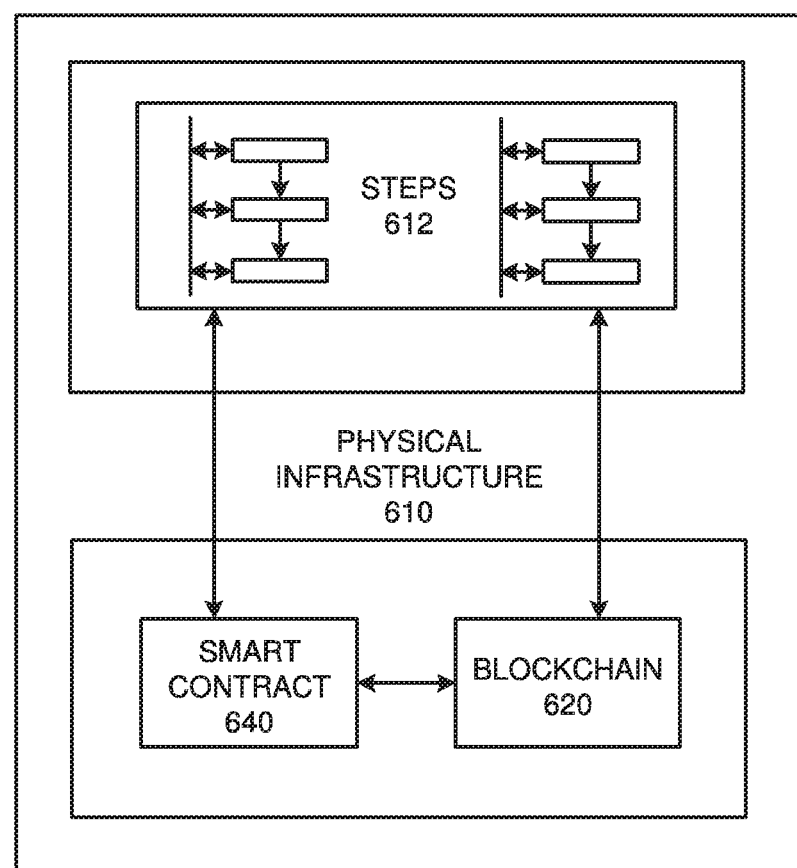
FIG. 6A is a diagram illustrating a physical infrastructure configured to perform various operations on the blockchain in accordance with one or more operations described herein, according to example embodiments.

FIG. 6A illustrates a physical infrastructure configured to perform various operations on the blockchain in accordance with one or more of the methods of operation according to example embodiments. Referring to FIG. 6A, configuration 600 includes a physical infrastructure 610 with a blockchain 620 and a smart contract 640, which may execute any of the operational steps 612 included in any of the example embodiments. The steps/operations 612 may include one or more aggregation logic steps for iteratively composing a hashed summary for using in building an artificial intelligence data/model. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
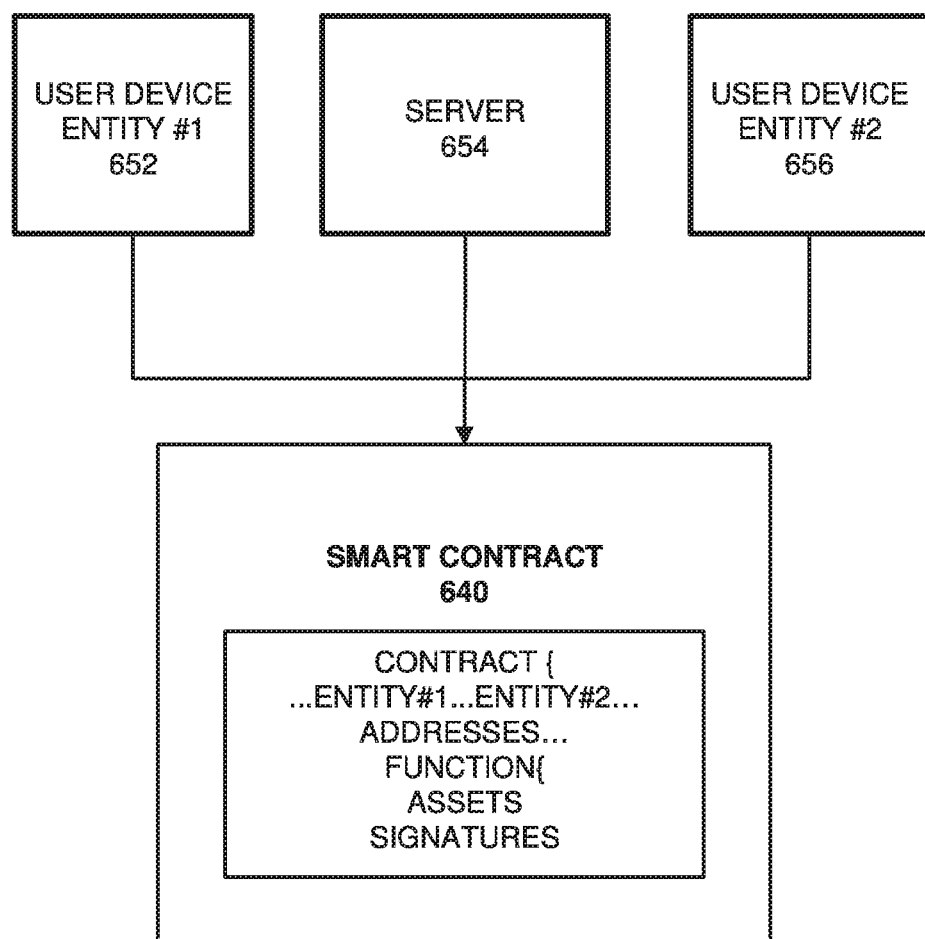
FIG. 6B is a diagram illustrating a smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, configuration 650 may represent a communication session, an asset transfer session or a process or procedure that is driven by a smart contract 640 which explicitly identifies one or more user devices 652 and/or 656. The execution, operations and results of the smart contract execution may be managed by a server 654. For example, the server 654 may execute software program that includes aggregation logic as described herein for generating a hashed summary from hashed data and value information provided from a plurality of producer nodes. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
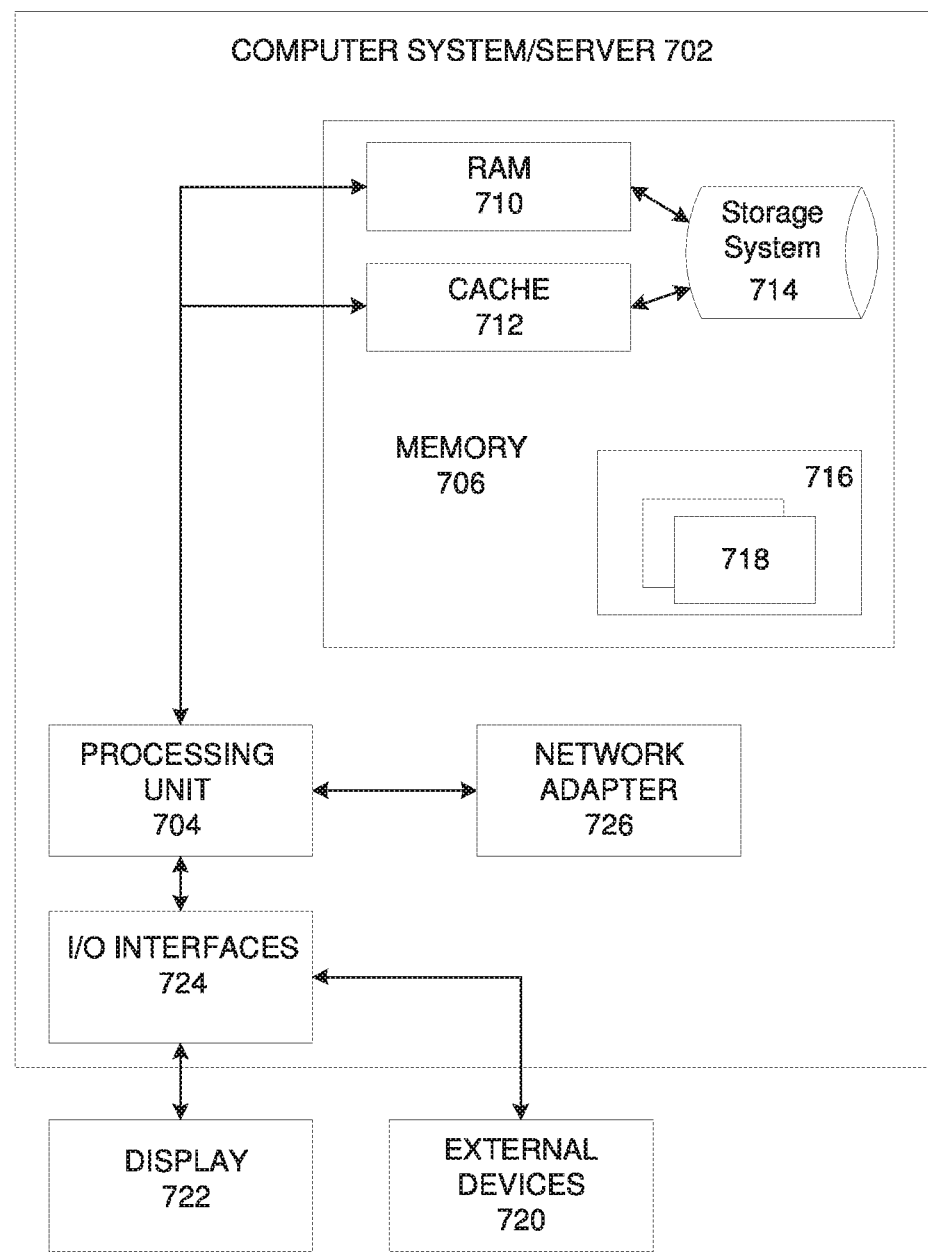
FIG. 7 is a diagram illustrating a computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove. For example, the computing node 700 may be a data providing node, a learning service providing node, a verification node, or some other type of node used herein.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 (e.g., network interface, etc.) communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

According to various embodiments, the processor 704 may partition a data set from a data provider into an initial training data set and an initial test data set based on one or more data partition attributes, control the network interface 726 to transmit the initial training data set to a learning service provider and prevent the learning service provider from being able to access the initial test data set, wherein the processor encrypts the initial test data set and stores the encrypted test data set in a data block of an immutable ledger where it can be subsequently audited. The network interface 726 may receive a learning model that is generated by the learning service provider based on the provided initial training data set. The processor 704 may execute the received learning model based on the initial test data set as input to verify whether the learning model satisfies a predefined performance threshold, and in response to the learning model being verified, control the network interface 726 to output information about the verification to a computing node that is associated with the data provider of the data set.

In some embodiments, the processor 704 may partition the data set via execution of a smart contract that partitions the data set based on the one or more data partition attributes that are hidden from the learning service provider. For example, the processor 704 may divide the data set such that the initial training data set is larger than the initial test data set. In some embodiments, the processor 704 may execute a smart contract storing a performance threshold previously agreed on by the data provider and the learning service provider to verify whether the learning model satisfies the agreed on performance threshold. In some embodiments, the processor 704 may control the network interface 726 to transmit an encryption key to be used to decrypt the encrypted initial test data set to verification system to enable the verification system to audit the verified performance threshold.

In some embodiments, the network interface 726 may receive a second learning model that is generated by a second learning service provider based on a second training data set that is provided by a second data provider. The processor is further configured to execute the second learning model based on a second test data set provided by the second data provider to verify whether the second learning model satisfies a second predetermined performance threshold. In some embodiments, the processor 704 may iteratively receive an updated learning model from the learning service provider and an updated second learning model from the second learning service provider until either of the learning service provider and the second learning service provider are no longer able to improve the respective learning models.

Although an exemplary embodiment of one or more of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via one or more of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computing system, comprising:
    a processor configured to partition a first data set from a first learning service provider into a first training data set and a first test data set, partition a second data set from a second learning service provider into a second training data set and a second test data set, transmit the first training data set to the second learning service provider, transmit the second training data set to the first learning service provider, and store the first and second test data sets in a data block of an immutable ledger; and
    a network interface configured to receive a first learning model that is generated by the first learning service provider based on the second initial training data set, and receive a second learning model that is generated by the second learning service provider based on the first initial training data set,
    wherein the processor is further configured to execute the first learning model based on the first test data set as input and execute the second learning model based on the second test data set as input to verify whether both the first and second learning models satisfy a performance threshold, and control the network interface to output information about the verification to a computing node.

2. The computing system of claim 1, wherein the processor is configured to partition the first data set into the first training data set and the first test data set based on one or more data partition attributes.

3. The computing system of claim 1, wherein the processor is configured to execute a smart contract storing the performance threshold to verify whether the first and second learning models satisfy the performance threshold.

4. The computing system of claim 1, wherein the processor is configured to encrypt the first and second test data sets prior to storing the first and second test data sets in the data block.

5. The computing system of claim 1, wherein the processor is further configured to iteratively receive updates to the first and second learning models from the first and second learning service providers using training data from the other until either the first learning service provider is no longer able to improve the first learning model or the second learning service provider is no longer able to improve the second learning model.

6. The computing system of claim 5, wherein the processor is further configured to:
    terminate a collaborative learning process between the first and second learning service providers when either the first learning service provider is no longer able to improve the first learning model or the second learning service provider is no longer able to improve the second learning model.

7. A method, comprising:
partitioning a first data set from a first learning service provider into a first training data set and a first test data set and partitioning a second data set from a second learning service provider into a second training data set and a second test data set;
transmitting the first training data set to the second learning service provider, transmitting the second training data set to the first learning service provider, and storing the first and second test data sets in a data block of an immutable ledger;
receiving a first learning model that is generated by the first learning service provider based on the second training data set and receiving a second learning model that is generated by the second learning service provider based on the first initial training data;
executing the first learning model using the first test data set as input and executing the second learning model using the second test data as input to verify whether both the first and second learning models satisfy a predefined performance threshold; and
outputting information about the verification to a computing node.

8. The method of claim 7, wherein the partitioning comprises partitioning the first data set into the first training data set and the first test data set based on one or more data partition attributes.

9. The method of claim 7, wherein the executing further comprises executing a smart contract storing the performance threshold which verifies whether the first and second learning models satisfy the predetermined performance threshold.

10. The method of claim 7, further comprising encrypting the first and second test data sets prior to storing the first and second test data sets in the data block.

11. The method of claim 7, further comprising iteratively receiving updates to the first and second learning models from the first and second learning service providers using training data from the other until either the first learning service provider is no longer able to improve the first learning model or the second learning service provider is no longer able to improve the second learning model.

12. The method of claim 11, further comprising:
terminating a collaborative learning process between the first and second learning service providers when either the first learning service provider is no longer able to improve the first learning model or the second learning service provider is no longer able to improve the second learning model.

13. A non-transitory computer readable storage medium storing program instructions that, when executed, cause a processor to perform a method comprising:
partitioning a first data set from a first learning service provider into a first training data set and a first test data set and partitioning a second data set from a second learning service provider into a second training data set and a second test data set;
transmitting the first training data set to the second learning service provider, transmitting the second training data set to the first learning service provider, and storing the first and second test data sets in a data block of an immutable ledger;
receiving a first learning model that is generated by the first learning service provider based on the second training data set and receiving a second learning model that is generated by the second learning service provider based on the first initial training data;
executing the first learning model using the first test data set as input and executing the second learning model using the second test data set as input to verify whether both the first and second learning models satisfy a predefined performance threshold; and
outputting information about the verification to a computing node.

14. The non-transitory computer readable storage medium of claim 13, wherein the partitioning comprises partitioning the first data set into the first training data set and the first test data set based on one or more data partition attributes.

15. The non-transitory computer readable storage medium of claim 13, wherein the executing further comprises executing a smart contract storing the performance threshold which verifies whether the first and second learning models satisfy the performance threshold.

16. The non-transitory computer readable storage medium of claim 13, further comprising encrypting the first and second test data sets prior to storing the first and second test data sets in the data block.

* * * * *